United States Patent [19]
Paxton et al.

[11] Patent Number: 5,382,048
[45] Date of Patent: Jan. 17, 1995

[54] SOFT DEPLOYMENT AIR BAG FOLD

[75] Inventors: Donald J. Paxton, Brigham City; David J. Dyer, Kaysville, both of Utah

[73] Assignee: Morton International, Inc., Chicago, Ill.

[21] Appl. No.: 147,763

[22] Filed: Nov. 5, 1993

[51] Int. Cl.6 ............................................. B60R 21/20
[52] U.S. Cl. .............................. 280/728 R; 280/743 R
[58] Field of Search .......... 280/743 R, 730 R, 728 R, 280/732, 731, 742, 743 A

[56] References Cited

U.S. PATENT DOCUMENTS

| | | | |
|---|---|---|---|
| 3,748,477 | 7/1973 | Wulbrecht | 280/743 R |
| 4,351,544 | 9/1982 | Ross | 280/743 R |
| 5,022,675 | 6/1991 | Zelenak, Jr. et al. | 280/743 R |
| 5,140,799 | 8/1992 | Satoh | 280/743 R |
| 5,178,407 | 1/1993 | Kelley | 280/743 R |
| 5,290,061 | 3/1994 | Bollaert | 280/743 R |

FOREIGN PATENT DOCUMENTS

| | | | |
|---|---|---|---|
| 5065047 | 3/1993 | Japan | 280/743 R |

*Primary Examiner*—Eric D. Culbreth
*Assistant Examiner*—Peter C. English
*Attorney, Agent, or Firm*—Gerald K. White

[57] ABSTRACT

An improved fold configuration of top mounted air bag cushions which tend to deploy high in a vehicle compartment and tend also to deploy at great velocity at an occupant's head uses several fold variations including a folded bubble on top, tucks, a pleat and rolls which inversely roll down the vehicle dashboard when an inflating fluid under pressure flows into the cushion, which folds can only unfold in sequence one after another so that the cushion does not unfold faster than it can be filled with inflating fluid and deploys relatively slowly in a downward trajectory.

6 Claims, 5 Drawing Sheets

SOFT DEPLOYMENT AIR BAG FOLD

BACKGROUND OF THE INVENTION

1. Field of the Invention

This invention relates to an air bag which is inflatable for restraining an occupant of a vehicle during a collision. More particularly, the invention relates to folding an air bag in a manner to improve the deployment thereof.

Typically, an air bag cushion is folded and supported on the steering wheel or dashboard of a vehicle. When the air bag is to be inflated, high pressure gas from an inflator is caused to flow therein through a gas inlet opening or mouth thereof. This causes the air bag to unfold and inflate.

2. Description of the Related Art

Upon vehicle impact in a collision, top mounted air bag cushions, that is, those mounted near the top of the dashboard, tend to deploy high in the vehicle compartment and tend also to deploy with great velocity at the passenger's head. More specifically, as most air bag cushions deploy, the pressure in-the cushion spikes to a high pressure initially. The high pressure ejects the folded cushion out of the air bag module with great velocity. This results in the cushion slapping the passenger as it unfolds. Such "slapping" of the passenger, particularly when an out-of-position child, with the cushion material could cause skin abrasions, excessive neck extension, and increase head injury criteria values.

Thus, there is a need and a demand for alleviating and/or correcting this problem so that the air bag cushion has a lower velocity deployment which results in elimination or reduction in "bag slap" injuries.

SUMMARY OF THE INVENTION

An object of the invention is to provide an improved fold configuration for an air bag cushion that effects a reduction in the deployment velocity of the cushion and causes the cushion to deploy lower and more toward the vehicle occupant's midsection or torso.

In order to cause the cushion to deploy lower and more toward the occupant's midsection, it must be folded in a manner such that it unfolds in along the rearward face of the dashboard. In order to reduce the velocity of the cushion deployment, the cushion must not unfold faster than the inflator can fill it with gas. To make the cushion deploy slowly in a downward trajectory, the cushion can have many stages of different types of folds which can only unfold in sequence one after another.

Air bag cushion folds known in the prior art use a folded "bubble" on top, tucks, a pleat and rolls which inversely roll down the instrument panel of the dashboard. The present invention uses several of such folds in sequence. As the cushion deployment develops, pressurized gas stored therein pushes open each fold one after another until the cushion fully deploys. If the folds of the cushion are difficuclt for the inflator pressurized gas to push open, this reduces the velocity of the cushion as it unfolds.

In accordance with the present invention, a bubble of fabric first opens against the windshield of the vehicle, pushing the rest of the cushion fold downward. Next, a roll of fabric unfolds downward against the instrument panel and then fabric portions tucked into each side of the unrolled cushion are pushed out. This allows the next roll to unfold along the instrument panel. Finally, the center of the fabric blossoms out allowing the cushion to fill completely with gas.

The effectiveness of the air bag cushion fold configuration of the present invention in solving the problem of high velocity deployment which increases "bag slap" injuries to vehicle occupants is demonstrated by comparing its pressure-time curve with that of other air bag cushion folds. As most cushion folds deploy, the pressure in the cushion spikes initially to a high pressure. This high pressure ejects the folded cushion out of the module with great velocity. This great velocity causes the pressure in the cushion to go negative, that is, become less than zero, because the cushion begins to unfold faster than the inflator can supply gas to fill it up. As the air bag cushion fold configuration of the present invention deploys, however, the pressure in the cushion does not usually go negative because the fold sequence does not allow the cushion to eject with a velocity great enough to cause this to happen.

The various features of novelty which characterize the invention are pointed out with particularity in the claims annexed to and forming a part of the specification. For a better understanding of the invention, its operating advantages, and specific objects attained by its use, reference is made to the accompanying drawings and descriptive matter in which preferred embodiments of the invention are illustrated.

BRIEF DESCRIPTION OF THE DRAWINGS

With this description of the invention, a detailed description follows with reference being made to the accompanying drawings which form part of the specificiation, of which.

DESCRIPTION OF THE PREFERRED EMBODIMENT

Figure 1:
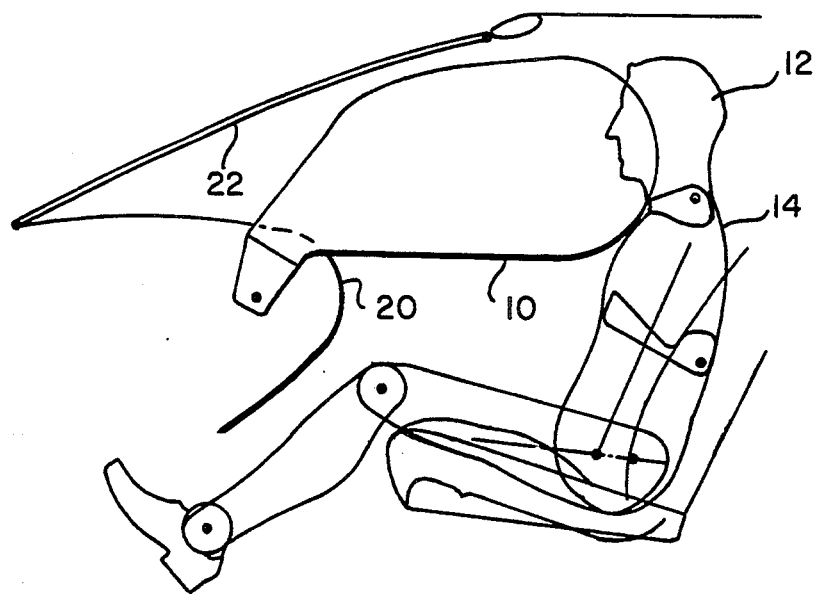
FIG. 1 is a schematic illustration portraying partial inflation of an air bag cushion which had been folded and stored in a manner known in the prior art to restrain a passenger in a vehicle during a collision.

In inflatable air bag systems for restraining a passenger of a vehicle during a collision, a folded air bag cushion commonly is stored in a module mounted high on the dashboard of the vehicle. Upon the occurrence of a collision of the vehicle, the folded air bag cushion is inflated to restrain the passenger. Initiation of inflation of a folded air bag cushion 10 known in the prior art to restrain a passenger in a vehicle is illustrated in FIG. 1. As shown in FIG. 1, a pressurized fluid such as nitrogen gas produced by an inflator (not shown) is forced to flow into the mouth of the cushion to cause a portion of the cushion to deploy at great velocity initially toward the head 12 of a passenger 14 of the vehicle.

Figure 2:
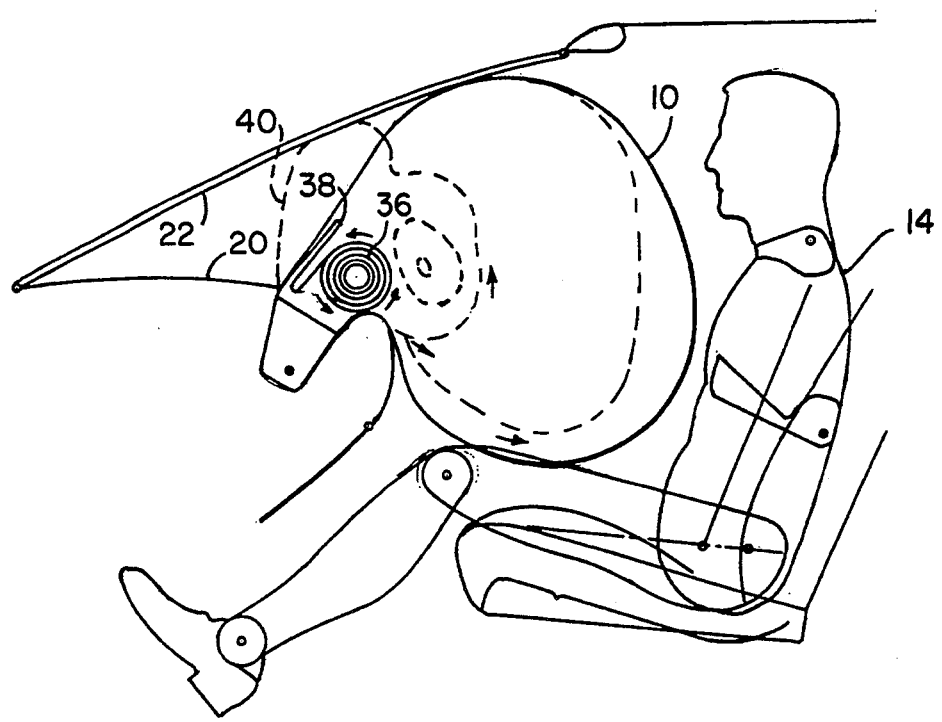
FIG. 2 is a depiction, in various stages of development, of an air bag cushion that had been folded and stored in the vehicle in accordance with the present invention and includes a depiction of the cushion at full bag deployment and pressure.

Initial deployment of a folded air bag cushion 10 having the same construction as the air bag cushion 10 shown in FIG. 1 is illusrated in FIG. 2. The air bag cushion 10 in FIG. 2, however, is folded in accordance with the present invention. As the pressurized nitrogen gas or other inflating fluid enters the air bag cushion 10 shown in FIG. 2, a portion of the cushion initially deploys toward the midsection of the passenger 14 in the vehicle. Initially, in FIG. 2, the inflating air bag cushion 10 does not deploy toward the head 12 of the passenger 14, as in the prior art arrangement illustrated in FIG. 1.

When in a fully inflated condition, the air bag cushions 10 of FIGS. 1 and 2 are positioned between the passenger 14 and the dashboard 20 and windshield 16 of the vehicle and restrain movement of the passenger 14 during sudden deceleration of the vehicle.

Figure 3A:
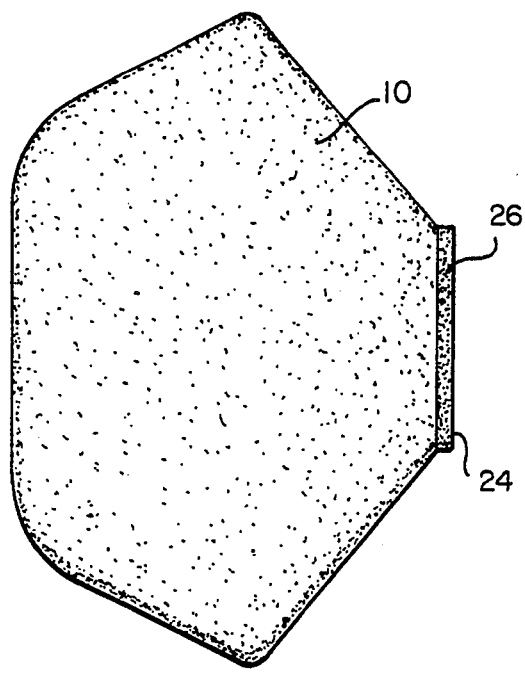
FIGS. 3A and 3B are plan and side views, respectively, of the air bag cushion of FIGS. 1 and 2 lying flat prior to folding.
Figure 3B:
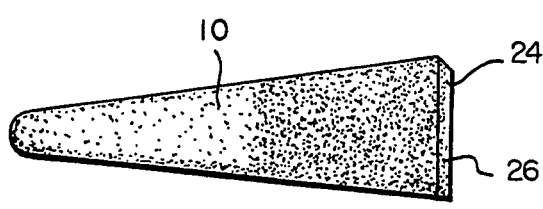

The air bag cushion 10 illustrated in FIGS. 3A and 3B is lying flat prior to folding. As shown, the air bag cushion 10 includes a generally rectangular attachment or retainer 26 that defines the inflating gas inlet opening or mouth 24 of the cushion 10 and connects the air bag cushion 10 to the dashboard of the vehicle.

The air bag cushion fold according to the invention is illustrated in FIGS. 4 through 18 of the drawings and comprises Steps 1 through 7, as described hereinafter.

Figure 4:
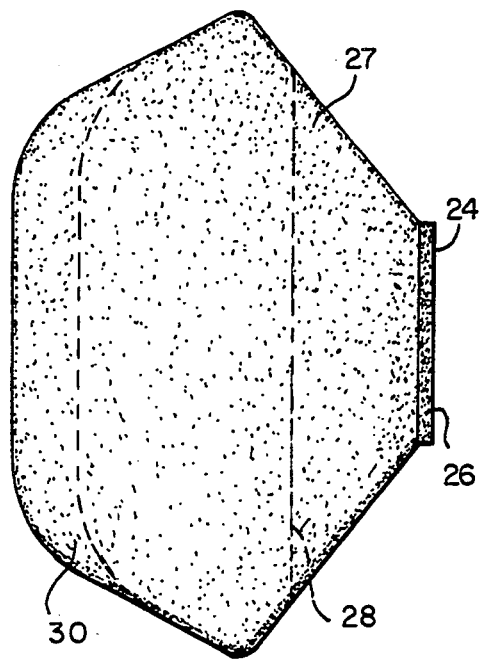
FIG. 4 is a plan view of the air bag cushion of FIGS. 2, 3A and 3B unfolded and uninflated and laid flat so that the bottom of the cushion faces up, with a portion of the center of the cushion tucked in toward the cushion gas inlet or mouth, creating an upper and a lower pleat.
Figure 5:
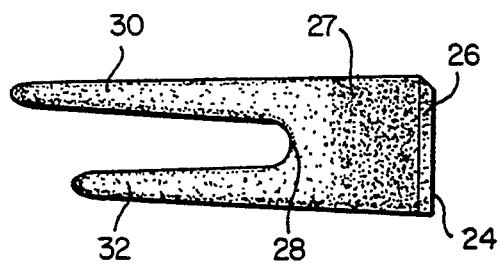
FIG. 5 is a side view of the FIG. 4 cushion showing the upper and lower pleats.

Step 1: As shown in FIG. 4, lay the cushion 10 so that the bottom 27 of the cushion 10 faces up. Tuck the center 28 of the cushion toward the cushion mouth 24 thereby creating an upper pleat 30 and a lower pleat 32, as shown in FIG. 5. The pleats 30 and 32 should be even in length or the upper pleat 30 may be longer than the lower pleat 32.

Figure 6:
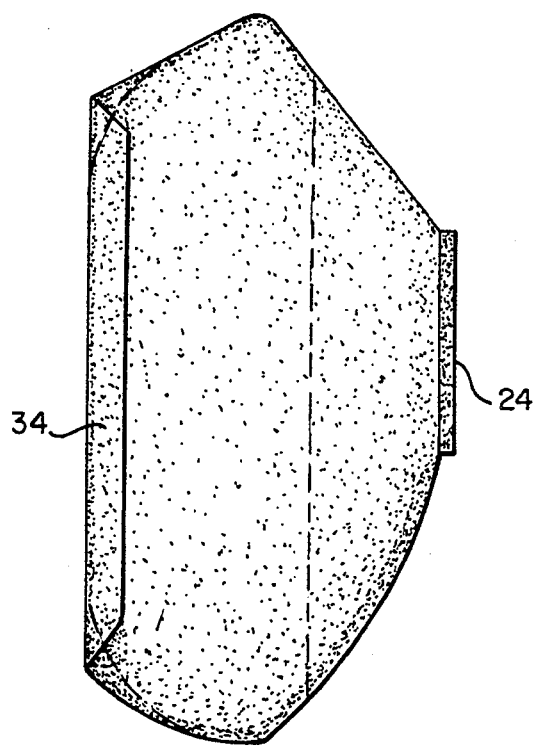
FIGS. 6 and 7 are views similar to FIGS. 4 and 5, respectively, but showing the lower cushion pleat partially rolled with the upper pleat, stopping after about half of the fabric is rolled up.
Figure 7:
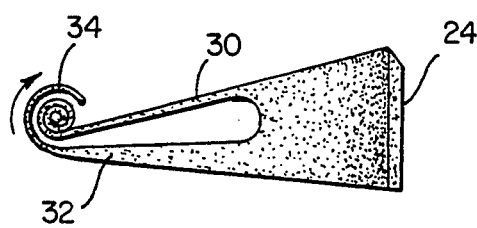

Step 2: As shown in FIGS. 6 and 7, roll the lower pleat 32 with the upper pleat 30 to form a roll 34 stopping after about half of the fabric is rolled up. If the upper pleat 30 is longer than the lower pleat 32, as shown in FIGS. 4 and 5, roll the upper pleat 30 first and then include the lower pleat 32 in the roll 34 when it is met.

Figure 8:
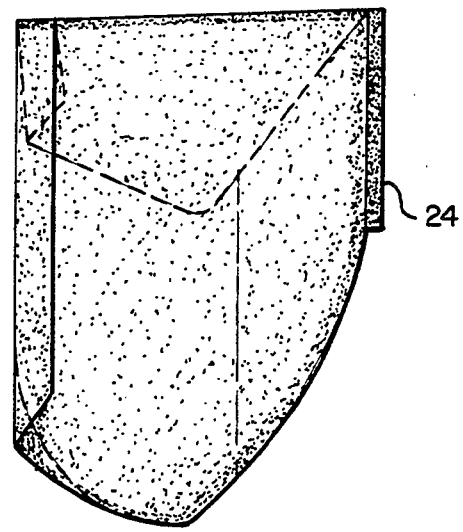
FIGS. 8 and 9 are views similar to FIGS. 6 and 7 but showing one side of the rolled cushion fabric tucked in between the upper and lower pleats.
Figure 9:
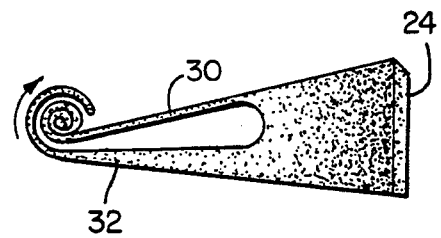
Figure 10:
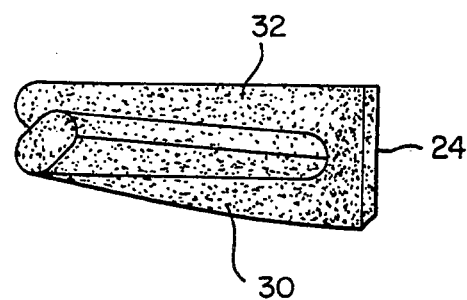
FIG. 10 is a view similar to FIG. 9 but showing the side of the cushion with tucked in fabric.

Step 3: Tuck one side of the rolled cushion fabric in between the upper pleat 30 and the lower pleat 32, as illustrated in FIGS. 8, 9 and 10.

Figure 11:
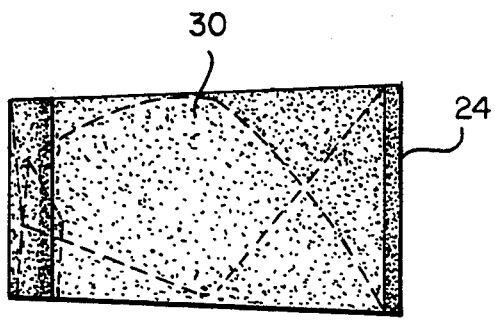
FIG. 11 is a plan view similar to FIG. 8 but showing the rolled cushion fabric on the opposite side of the air bag cushion tucked inside the bag between the upper and lower pleats.
Figure 12:
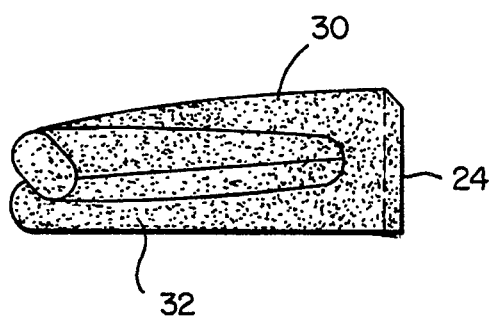
FIG. 12 is an inverted view of FIG. 11 showing the tucked in cushion fabric on the opposite side.

Step 4: Tuck the opposite side of the rolled cushion fabric between the upper pleat 30 and the lower pleat 32, as illustrated in FIGS. 11 and 12. At this point in the folding operation, the width of the folded cushion 10 should be about the width of the mouth 24 of the cushion.

Figure 13:
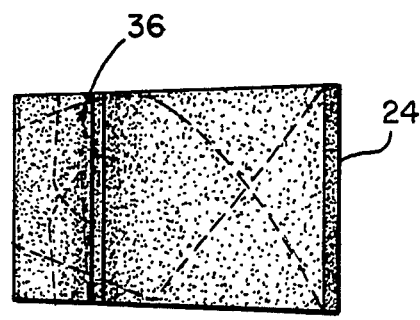
FIG. 13 is a plan view similar to FIG. 11 but showing additional rolling of the bag toward the mouth of the cushion.
Figure 14:
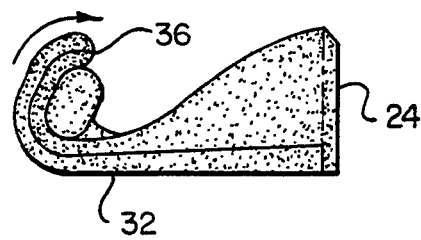
FIG. 14 is a side view showing the upper and lower pleats of the folded cushion of FIG. 13.

Step 5: As shown in FIGS. 13 and 14, continue rolling the fabric of the air bag cushion toward the mouth 24 of the cushion to form a roll 36, stopping at a point where Steps 6 and 7 may be performed.

Figure 15:
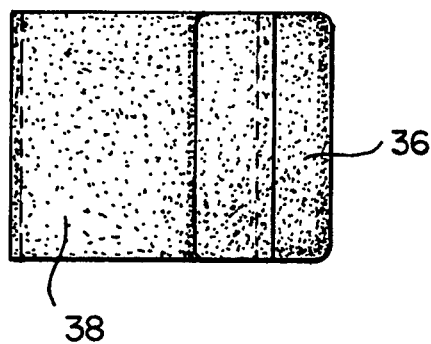
FIG. 15 is a plan view similar to FIG. 11 showing the roll inserted into the mouth of the cushion retainer leaving a loop of excess fabric protruding.
Figure 16:
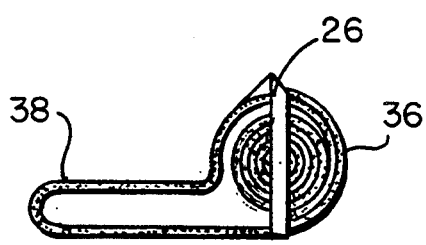
FIG. 16 is a side view of the rolled up cushion shown in FIG. 15.

Step 6: As shown in FIGS. 15 and 16, insert the roll 36 as folded to this point into the mouth 24 of the cushion retainer 26 leaving a loop 38 of excess fabric protruding.

Figure 17:
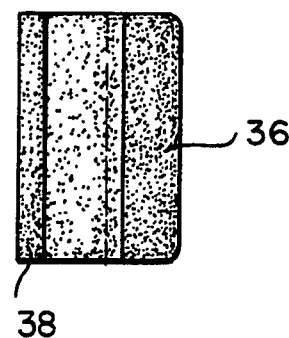
FIG. 17 is a plan view similar to FIG. 15 showing the excess fabric rolled over the roll.
Figure 18:
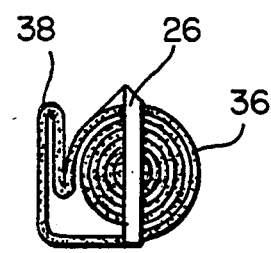
FIG. 18 is a side view of the rolled up cushion shown in FIG. 17.

Step 7: Fold over excess fabric 38 over the roll 36 as shown in FIGS. 17 and 18.

As those skilled in the art will understand, the foregoing steps according to the invention could achieve the same effect in other orders and by repeating the same steps during the folding process.

Upon inflation of the air bag cushion 10 folded in accordance with the invention and mounted in the dashboard 20 of a vehicle, a bubble 40 formed by the loop 38 of excess fabric first opens against the windshield, as shown in FIG. 2. This causes the rest of the cushion fold to be pushed downward. The roll of fabric 36 then unfolds downward against the dashboard, following which the fabric portions tucked into each side of the unrolled cushion are pushed out. This allows the next roll 34 to unfold. The center of the fabric finally blossoms out allowing the cushion to completely fill with gas.

This unfolding of the folded air bag cushion 10 is along the rearward face of the dashboard 20 of the vehicle. Because the cushion has many stages of different types of folds which can only unfold in sequence one after another, the cushion deploys relatively slowly in a downward trajectory, with initial deployment of the cushion 10 against the midsection of the passenger 14. The velocity of cushion deployment is reduced because the cushion can not unfold faster than the inflator can fill it with gas.

With this description of the invention in detail, those skilled in the art will appreciate that modifications may be made to the invention without departing from the spirit thereof. Therefore, it is not intended that the scope of the invention be limited to the specific embodiment that has been illustrated and described. Rather, it is intended that the scope of the invention be determined by the scope of the appended claims.

What is claimed is:

1. An inflatable folded air bag cushion for restraining a vehicle occupant, said air bag cushion being top mounted on the vehicle dashboard and using several fold variations comprising a folded bubble on top, tucks, a pleat and rolls which inversely roll down the dashboard of the vehicle when an inflating fluid flows into the cushion, which folds can only unfold in sequence one after another, said air bag cushion being made of air bag fabric and having a mouth defined by a cushion retainer, said air bag cushion having a top and a bottom and an initially unfolded and uninflated condition, said air bag cushion when in said initially unfolded and uninflated condition being positioned with the bottom facing up and the mouth at a central side position, folding of said air bag cushion being effected by a succession, one after the other, of tucks and rolls comprising:

the center of the fabric being tucked toward the mouth of the air bag cushion to create an upper pleat and a lower pleat, the lower pleat with the upper pleat being rolled toward the mouth of the air bag, stopping after about half of the fabric of the air bag cushion is rolled up, one side of the rolled cushion fabric being tucked to the adjacent edge of the cushion mouth inside of the cushion between the upper and lower pleats, the opposite side of the rolled cushion fabric being tucked to the adjacent edge of the cushion mouth inside of the cushion between the upper pleat and the lower pleat, the width of the folded cushion with the sides of the rolled cushion so tucked being about the width of the mouth of the cushion, and the tucked fabric of the cushion being rolled additionally toward the mouth of the cushion, stopping at a point at which the rolled cushion may be inserted into the mouth of the air bag cushion defined by the cushion retainer with a loop of excess fabric folded over the rolled cushion, whereby said air bag cushion does not unfold faster than it can be filled with inflating fluid and deploys relatively slowly in a downward trajectory.

2. An inflatable folded air bag cushion as defined by claim 1, wherein, if, when the center of the fabric is tucked toward the mouth of the air bag cushion the upper pleat is longer than said lower pleat, the rolling of the upper pleat is effected first and then the rolling of the lower pleat is effected when it is met, with the rolling being stopped after about half of the fabric of the cushion is rolled up.

3. An inflatable folded air bag cushion as defined by claim 1, wherein the inflating fluid pushes open each fold of the folded air bag cushion one after another until the cushion fully deploys, wherein, finally, a central portion of the cushion blossoms out allowing the cushion to completely fill with inflating fluid.

4. An inflatable folded air bag cushion as defined by claim 3, wherein said loop of excess fabric first opens against the windshield of the vehicle, pushing the rest of the cushion fold downward, next, a roll of fabric unfolds downward against the dashboard of the vehicle, then the fabric tucks are pushed out from between the upper and lower pleats allowing the next roll to unfold along the dashboard, and finally, the central portion of the cushion fabric blossoms out allowing the cushion to completely fill with gas.

5. A method of folding an inflatable air bag cushion made of air bag fabric and having a mouth defined by a cushion retainer comprising the steps, with the cushion initially unfolded and uninflated and positioned with the bottom thereof facing up and the mouth at a central side position thereof of:

a. tucking the center of the cushion toward the mouth, creating an upper pleat and a lower pleat, b. rolling the lower pleat with the upper pleat, stopping after about half of the fabric is rolled up, c. tucking one side of the rolled cushion fabric to the adjacent edge of the cushion mouth in between the upper and lower pleats, d. tucking the opposite side of the rolled cushion fabric to the adjacent edge of the cushion mouth inside of the cushion between the upper pleat and the lower pleat, at the conclusion of which tucking the width of the folded cushion should be about the width of the mouth of the cushion, e. additionally rolling the fabric of the cushion toward the mouth of the cushion, stopping at a point at which the rolled cushion may be inserted into the mouth of the air bag cushion defined by the cushion retainer with a loop of excess fabric folded over the rolled cushion, f. inserting the rolled cushion into the mouth of the air bag cushion defined by the cushion retainer leaving a loop of excess fabric protruding from the retainer, and g. folding the loop of excess fabric over the rolled cushion.

6. A method as defined by claim 5 wherein, in step b, if the upper pleat is longer than the lower pleat, rolling the upper pleat first and then including the lower pleat in the roll when it is met and stopping the rolling after about half of the fabric is rolled up.

* * * * *